United States Patent [19]

Haugeneder

[11] Patent Number: 5,080,166
[45] Date of Patent: Jan. 14, 1992

[54] PLATE-SHAPED HEATING ELEMENT, IN PARTICULAR FOR FLOOR HEATING

[75] Inventor: Hans Haugeneder, Baden bei Wien, Austria

[73] Assignee: Itrag AG, Glarus, Switzerland

[21] Appl. No.: 222,289

[22] Filed: Jul. 19, 1988

Related U.S. Application Data

[63] Continuation of Ser. No. 38,398, Apr. 15, 1987, abandoned.

[51] Int. Cl.$^5$ .................. F28F 3/14; F28F 21/06; F24D 3/14; F24D 19/02
[52] U.S. Cl. ..................... 165/56; 165/49; 165/46; 165/170; 237/69
[58] Field of Search ............ 165/49, 56, 46, 170; 237/69

[56] References Cited

U.S. PATENT DOCUMENTS

| 750,058 | 1/1904 | Nichols | 165/170 |
|---|---|---|---|
| 1,055,324 | 3/1913 | Feldkamp | 165/170 |
| 1,774,860 | 9/1930 | Wendler et al. | 165/170 |
| 2,956,785 | 10/1960 | Riehl | 165/56 |
| 4,111,186 | 9/1978 | Ross et al. | 165/170 |
| 4,184,543 | 1/1980 | Kleine et al. | 165/170 |
| 4,524,757 | 6/1985 | Buckley | 165/46 |
| 4,600,053 | 7/1986 | Patel et al. | 165/170 |
| 4,662,561 | 5/1987 | Dietzsch et al. | 165/170 |

FOREIGN PATENT DOCUMENTS

| 0052321 | 5/1982 | European Pat. Off. | 165/46 |
|---|---|---|---|
| 0065679 | 12/1982 | European Pat. Off. | 165/170 |
| 3037873 | 5/1982 | Fed. Rep. of Germany | 165/170 |
| 3222184 | 12/1983 | Fed. Rep. of Germany | 165/56 |
| 8403592 | 8/1984 | Fed. Rep. of Germany | |
| 3331981 | 3/1985 | Fed. Rep. of Germany | |
| 3400483 | 7/1985 | Fed. Rep. of Germany | 165/56 |
| 3509895 | 9/1986 | Fed. Rep. of Germany | 237/69 |
| 3032694 | 2/1987 | Fed. Rep. of Germany | |
| 819022 | 10/1937 | France | 165/170 |
| 17978 | of 1901 | United Kingdom | 165/170 |
| 23445 | 10/1914 | United Kingdom | 165/170 |
| 390796 | 7/1931 | United Kingdom | 165/170 |
| 0390796 | 7/1931 | United Kingdom | 165/170 |

*Primary Examiner*—John Ford
*Attorney, Agent, or Firm*—Townsend and Townsend

[57] ABSTRACT

A plate-shaped heating element, in particular for floor heating, consists of two plates of synthetic material defining a hollow space. Spacing elements are provided between the plates in a direction perpendicular to the plane of the plates, the spacing elements uniting the two plates. The spacing elements are arranged so as to form a first row along a first straight line, said first straight line being an extension of the axis of the joining element. All other spacing elements form further rows, said rows being provided along straight lines which again are provided parallel to the first straight line.

31 Claims, 2 Drawing Sheets

1

PLATE-SHAPED HEATING ELEMENT, IN PARTICULAR FOR FLOOR HEATING

This is a continuation of application Ser. No. 07/038,398, field Apr. 15, 1987, now abandoned.

This invention relates to a plate-shaped heating element, in particular for floor heating.

Plate-shaped heating elements, which comprise two parallel plates and have spacing elements arranged between the plates, are known from German published application No. 3,032,694.

Such heating elements are preferably made from thermoelastic resin and necessitate the provision of spacing elements acting as supporting elements between the upper and lower plate in order to be capable of withstanding the forces acting on the heating elements when used for floor heating. Besides, heating elements of this kind have to be made so stable as to withstand the static internal pressure produced by the heating medium.

Heating elements of this type are also used for wall and ceiling heating and also for cooling purposes. For this reason it should always be ensured that the complete cavity between the two plates permits as even a flow of the medium as possible throughout.

SUMMARY OF THE INVENTION

It is therefore the object of the invention to provide a heating element which ensures as even a flow as possible throughout the cavity between the upper and lower plate.

The invention provides a plate-shaped heating element, in particular for floor heating, comprising two plastic plates defining therebetween a cavity and having provided therebetween spacing elements arranged perpendicular to the plane of the plates and uniting the plates together, further comprising fluid connections, whereat the spacing elements are arranged so as to form a first row along a first straight line, said first straight line corresponding to a projection of the axis of the fluid connection, whereas all the other spacing elements form further spacing element rows along further straight lines, said further straight lines extending parallel to the first straight line.

Because of various technical requirements, the average velocity of water in heating systems amounts to $v = 1.2$ m/sec. This value generally represents the highest water velocity in the joining elbows and connection pipes which may not be exceeded. At the same time, the dynamic cross section of each individual heating element is a multiple of the cross section of the joints. This reduces the water velocity by a multiple after the heating medium (or cooling medium) enters the heating element, often leading to velocities of flow which can no longer be said to correspond to a directional flow, at least in some areas. The invention provides a heating element with spacing elements being arranged to produce a very exact distribution of the heating medium, by way of example water, after it enters the heating element. Moreover, the resistance per heating element is exactly defined by arranging the spacing elements according to a predetermined pattern. In particular, care is taken to ensure that there is no continuous "passage" or "channel" between the fluid connections, which are roughly diametrically opposite in a plate-shaped heating element. Such a "passage" would correspond to the main flow and is avoided by arranging the spacing elements so as to have them displaced or staggered. As seen from the axis of the fluid connection, this means that the spacing elements are displaced with respect to one another, thus ensuring that the medium flowing through the heating element is distributed throughout the whole of the cavity.

Although the heating element is used preferably for floor heating systems, it may also be used for wall and ceiling heating or for cooling purposes.

BRIEF DESCRIPTION OF THE DRAWINGS

The plate-shaped heating element will now be described in more detail with reference to the drawing, in which.

DETAILED DESCRIPTION OF THE PREFERRED EMBODIMENT

Figure 1:
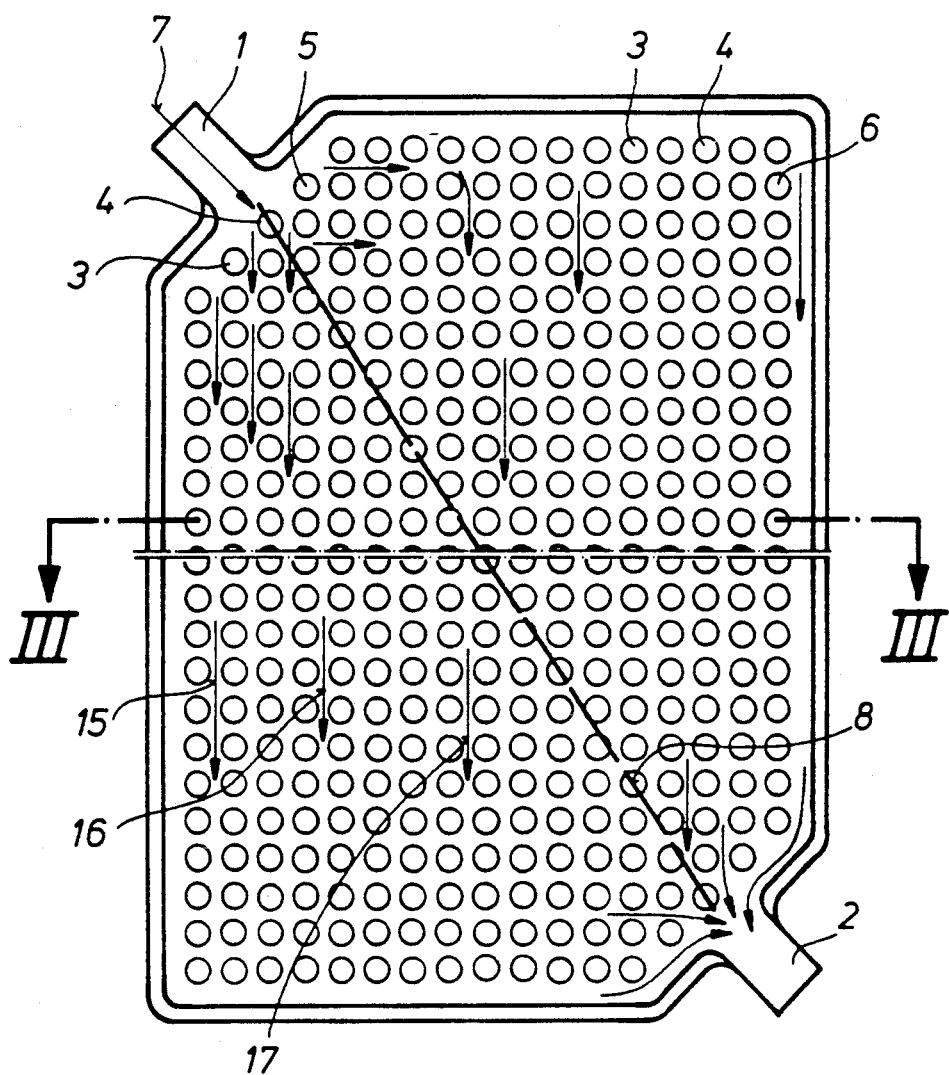
FIG. 1 shows a horizontal sectional view through a heating element.

FIG. 1 shows a horizontal sectional view of a plate-shaped heating element which comprises an upper and lower plate. The upper and lower plates are united by means of spacing elements, and a cavity is defined between the plates which is interspersed with the spacing elements in the manner described hereinafter.

Referring first to FIG. 1, the heating element comprises two fluid connections 1, 2 which are preferably in the form of tubular connection pieces and which are substantially diametrically opposite each other. As used herein, the term "diametrically opposite" refers to a disposition of fluid connectors 1, 2 substantially as shown in FIG. 1. Arranged between the two fluid connections 1, 2 in the plane of the drawing are rows which are substantially perpendicular to one another, that is to say vertical and horizontal rows of spacing elements, some of which are indicated by the reference numerals 3, 4, 5 and 6. Numeral 7 indicates the flow of the heating medium in the fluid connection on the input side. The heating element, which may be by way of example water, thus impinges the first row of spacing elements 3, 4, 5 after passing through the fluid connection 1 and is deflected to the sides by these spacing elements. As the arrows indicate, this ensures that the medium flows through the side areas of the cavity of the heating element, thus preventing a direct passage or free flow between the fluid connections 1, 2, which would otherwise be possible, i.e. if there were no spacing elements along the line marked 8 in FIG. 1.

Figure 2:
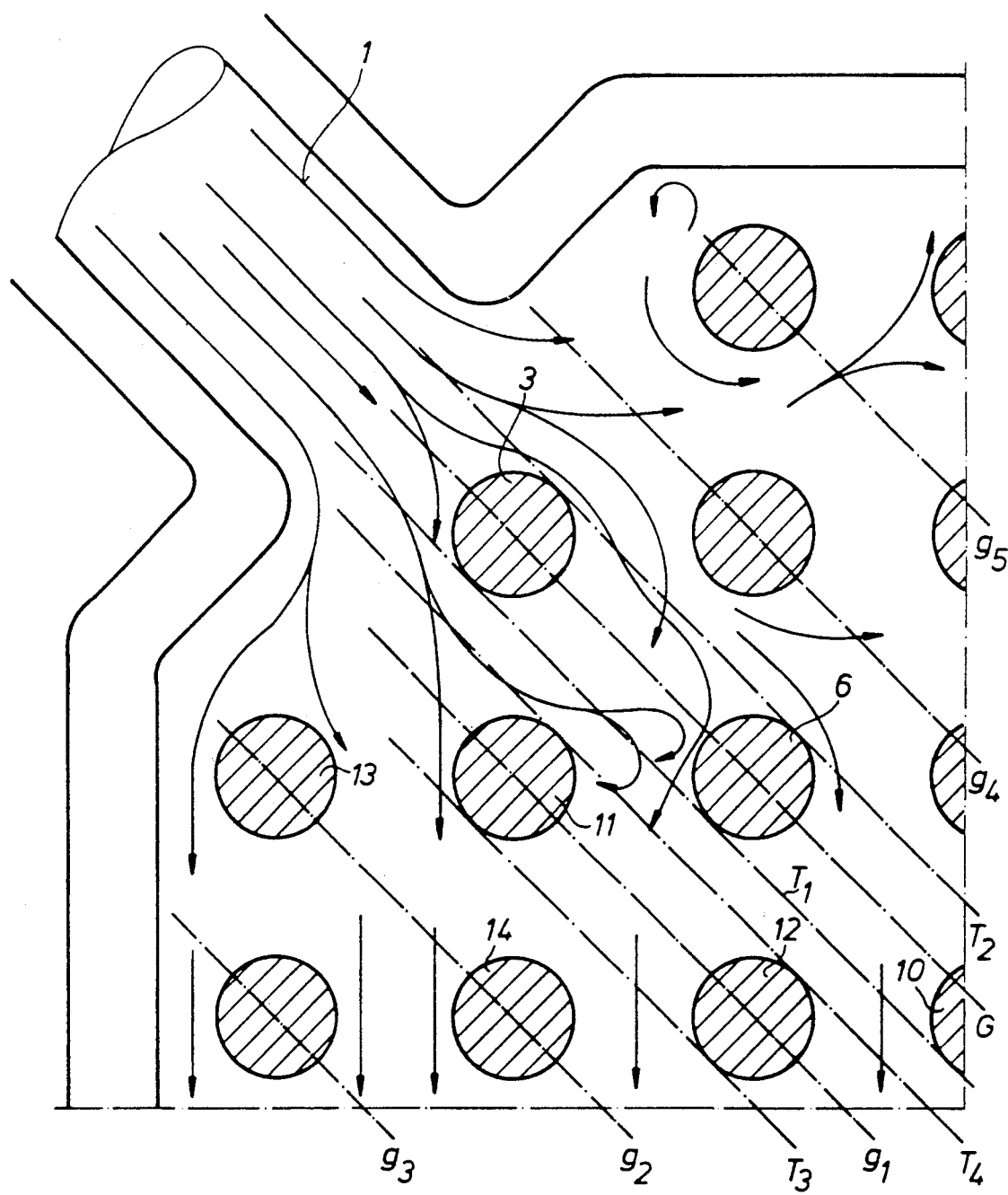
FIG. 2 shows a horizontal partial sectional view of the heating element according to FIG. 1 for explaining the conditions of flow.

The partial view shown in FIG. 2 illustrates the inventive concept of arranging the individual spacing elements. In FIG. 2, G denotes the extension of the centre axis of the tubular fluid connection 1. The first spacing element 3 is arranged on the straight line G opposite the middle of the fluid connection 1. Further spacing elements 6, 10, etc. are arranged behind spacing element 3 along the straight line G.

Spacing elements are arranged a distance apart from one another on the straight lines $g_1$, $g_2$, $g_3$, $g_4$, etc., which are parallel to straight line G, in exactly the same way as described with reference to the straight line G. Spacing elements 11, 12, amongst others, are provided on the straight line $g_1$, and spacing elements 13, 14, amongst others, are provided on the straight line $g_2$, and so forth. The same applies to the spacing elements arranged on the straight lines $g_4$, $g_5$. The view shown in FIG. 2 illustrates that the displaced arrangement of spacing elements corresponding to straight lines G, $g_1$ to $g_5$, etc. results in the heating medium flowing through the heating element not only along one passage but practically through the whole cavity of the heating element due to its being deflected; it thus reaches even the most remote areas at the sides of the heating element.

In the embodiment example shown in FIG. 2 the spacing elements are arranged with respect to the fluid connection on the input side so as to form a first row of spacing elements coinciding with the centre axis of the joining element 1, and so as to have further parallel rows on either side of the straight line G. Therefore, the heating element has a plurality of rows of spacing elements which are parallel to one another and parallel to the axis of the fluid connections 1, 2. The arrangement of the spacing elements at the side of the fluid connection 2 corresponds exactly to that as described with reference to FIG. 2.

As shown in FIG. 2, the spacing elements are provided in rows indicated by the straight lines and are spaced a substantially constant distance apart. The spacing elements 3, 13 on the lines G, $g_2$ are in side-by-side relationship a certain distance apart from each other, that is to say, the pattern comprises further rows of spacing elements which are perpendicular to the lines G, $g_1$, etc.

The spacing elements 3, 6, etc. on the line G form tangents $T_1$, $T_2$; similarly, the spacing elements on the line $g_1$ form tangents $T_3$, $T_4$ and so forth. The distance between adjacent tangents, for example $T_1$, $T_4$, is selected in accordance with the desired cross section of the flow. In the embodiment shown, this distance corresponds to about half the diameter of the spacing elements and may be reduced down to zero dependent on the desired cross section for increasing the flow resistance; at zero, for instance, tangent $T_1$ will coincide with tangent $T_4$.

A particular advantage of the invention is that the above-mentioned arrangement of the spacing elements provides optimum conditions of resistance and flow in the individual heating elements irrespective of their size and that the flow runs throughout the cavity of the heating elements without any danger of a passage being formed, no matter whether the heating elements are large or small. The flows indicated by arrows 15 to 17 in FIG. 1 are caused by passages remaining in the vertical direction; they provide a complete flow of medium throughout the heating element and into the most remote corners. These flows are guided back to the fluid connection 2, which is indicated by the arrows in the region of the joining element 2. These "passages" promote the distribution of the individual water currents in the heating element and result from arranging the spacing elements 3 to 5 and the associated rows in the area near the joining element 1 where the heating medium enters the heating element.

In accordance with the above description, it is a salient feature of the invention that the spacing element 4 and hence the straight line G are arranged on the centre axis of the joining element i and between the two fluid connections 1, 2, i.e. a free passageway between the entrance and exit of the heating medium is not allowed. The function of the spacing elements is to act as baffles.

They are varied in size or diameter to determine the desired cross section of the flow and hence the minimum flow velocity throughout the heating element.

In the heating element according to FIGS. 1 and 2 the flow velocity is highest in the area of the fluid connection 1, decreasing as the flow proceeds into the heating element while maintaining a low water velocity in all areas of the heating plate, and increasing again as it proceeds towards the joining element 2.

The heating element thus comprises a plurality of rows of spacing elements which are parallel to the axis of the joining elements; at the same time, there are free passages which extend in the vertical and horizontal direction, i.e. at an angle of about 45° to the extension of the axis of the joining elements, and which promote the flow of the medium through the side areas of the heating element.

Figure 3:
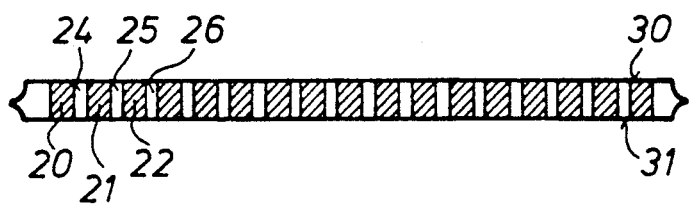
FIG. 3 shows a vertical sectional view through the heating element according to FIG. 1 along the line III—III.

FIG. 3 shows a sectional view along the line III—III in FIG. 1. Reference numerals 20, 21, 22 indicate the spacing elements in section along the line, whereas the numerals 24, 25, 26 denote a portion of the cavities remaining between the spacing elements. The upper plate of the heating element is indicated by numeral 30, the lower plate by 31. The two plates are firmly united at the sides, thus producing the cavity through which the heating medium flows.

As is apparent from FIG. 1, the arrangement of the spacing elements described with reference to FIG. 2 is continued through the remainder of the cavity up to the opposite joining element 2.

The velocity of flow of the medium in the heating plate is defined by determining the ratio of the surface cross section in the joining or connection conduits to that of the surface cross section in the heating plate, which is restricted by the above-mentioned maximum flow that is allowed in the connecting conduits.

The velocity in the heating plate should not be less than 0.1 m/sec in order to ensure that there are directional currents in the heating plate. A free flow of the medium from the cross section of the joining conduit into the cross section of the heating plate is prevented by the inventive arrangement of the first row of studs or pins which is transverse with respect to the direction of flow from the connection conduit into the heating plate. This reduces Carnot-Bordasch impact losses, where $Pv = P1 - P2$, and hence also lowers drag reduction.

In heating technology the mass flow for the individual heating plates can be calculated on the basis of the conditions of the physical structure and the conditions of load which can be relatively accurately defined by comfort limiting values. The ratio of the surface cross section should not exceed 1:4. The nomenclature 1:4 represents the ratio of the effective surface cross section of the heater with no spacing elements, to the effective surface cross section of the spacing elements alone.

When the heating plates are used as heat exchangers in cooling systems the ratio should not exceed 1:3.5 for the same reason. We have determined that a reduction of the cross section ratio to 1:3.5 produces advantageous results for use as heating as well as cooling plates. If the studs are arranged so as to have a surface cross section ratio of 1:3, the flow velocity is increased and the transmission of heat, which is directly associated with the flow velocity, is enhanced in each plate.

What is claimed is:

1. A flat heating element for floor heating system, comprising:

first and second plastic, substantially rectangular plates defining therebetween a cavity, spacing elements having a diameter, arranged in rows, said spacing elements extending perpendicular to the plane of the plates within said cavity and connecting the plates, and fluid connections, at diametrically opposing corners of said heating element, communication with the cavity, the fluid connections oriented such that fluid flow through each connection is substantially parallel to the plane of the plates, one of said connections lying along a first straight line, said fluid connections being located at substantially 45° with respect to respective sides of the plates, a first row of said spacing elements being arranged on said first straight line, further spacing elements being arranged on further straight lines which are parallel with said first straight line and being displaced to each other in the direction of said straight lines, the spacing elements of said further straight lines being arranged to form additional rows of spacing elements which are parallel to said first straight line, said spacing elements being so disposed as to preclude an unimpeded straight line flow path between said fluid connections, a spacing element closest to said fluid connection being located on the first straight line.

2. The heating element according to claim 1, wherein the distance between two adjacent straight lines is less than about 1.5 times the diameter of said spacing elements.

3. The heating element according to claim 1, herein the distance between respectively adjacent spacing elements of a row is constant.

4. The heating element according to claim 1, wherein the distance between respectively adjacent straight lines determining rows of spacing elements is constant.

5. The heating element according to claim 1, comprising spacing elements having a circular cross section.

6. The heating element according to claim 1, wherein the outer periphery of the spacing elements is arranged to intersect straight lines which are coincident with tangents extending parallel to the first straight line.

7. The heating element according to claim 1, wherein the outer periphery of the spacing elements is arranged to intersect straight lines which are coincident with tangents extending parallel to the first straight line and tangents of two adjacent rows of spacing elements are spaced a chosen distance apart, the distance chosen being in the range 0 to approximately half the diameter of the spacing elements.

8. The heating element according to claim 1, wherein said adjacent spacing elements on said further straight lines are arranged along additional straight lines which are perpendicular to said first straight line.

9. A flat element for floor heating systems, comprising:

first and second substantially rectangular plates defining therebetween a cavity;

spacing elements having a transverse dimension parallel to the plane of the plates, arranged in rows, said spacing elements extending perpendicular to the plane of the plates with said cavity and connecting the plates;

a first row of said spacing elements being arranged on a first straight line, further spacing elements being arranged on further straight lines which are parallel with said first straight line;

adjacent spacing elements on the further straight lines parallel to said first straight line being displaced to each other in the direction of said straight lines, the spacing elements of said further straight lines being arranged to form additional rows of spacing elements which are parallel to said first straight line;

first and second fluid connections, at diametrically opposing corners of said heating element, communicating with the cavity, the fluid connections being oriented such that fluid flow through each connection is substantially parallel to the plane of the plates, said first fluid connection lying along said first straight line said fluid connections being located at substantially 45° with respect to respective sides of the plates;

said spacing elements being so disposed as to preclude an unimpeded straight line flow path between said first and second fluid connection;

a spacing element closest to said first fluid connection being located on the first straight line.

10. A flat element for floor heating systems according to claim 7, wherein said first and second plates are plastic.

11. A flat element for floor heating systems according to claim 9, wherein the distance between two adjacent straight lines is less than about 1.5 times the transverse dimension of said spacing elements.

12. A flat element for floor heating systems according to claim 9, wherein the distance separating adjacent spacing elements in a row is constant.

13. A flat element for floor heating systems according to claim 9, wherein the distance between adjacent straight lines determining rows of spacing elements is constant.

14. A flat element for floor heating system according to claim 9, wherein each said spacing element has a circular cross-section.

15. A flat element for floor heating systems according to claim 9, wherein an outer periphery of the spacing elements arranged along straight lines are coincident with tangents extending parallel to said first straight line.

16. A flat element for floor heating systems according to claim 15, wherein tangents of two adjacent rows of spacing elements are spaced apart a chosen distance in the range of about zero to 50% of the transverse dimension of the spacing elements.

17. The heating element according to claim 9, wherein said adjacent spacing elements on said further straight lines are arranged along additional straight lines which are perpendicular to said first straight line.

18. A flat element for floor heating systems, comprising:

first and second substantially rectangular plates defining therebetween a cavity;

first and second fluid connections, each having an axis, at diametrically opposing corners of said heating element, communicating with the cavity, the fluid connections being oriented such that fluid flow through each connection is substantially parallel to the plane of the plates, said fluid connections being located at substantially 45° with respect to respective sides of the plates; and spacing elements having a transverse dimension parallel the plane of the plates, arranged in rows, said spacing elements extending perpendicular to the plane of the plate within said cavity and connecting the plates;

a first row of said spacing elements being arranged on a first straight line corresponding to a projection of the axis of the first fluid connection, further spacing elements being arranged on further straight lines which are parallel with said first straight line;

adjacent spacing elements on the further straight lines parallel to said first straight line being displaced to each other in the direction of said straight lines, the spacing elements of said further straight lines being arranged to form additional rows of spacing elements which are parallel to said first straight line;

said spacing elements being so disposed as to preclude an unimpeded straight line flow path between said first and second fluid connections;

a spacing element closest to said first fluid connection being located on the first straight line.

19. A flat element for floor heating systems according to claim 18, wherein said first and second plates are plastic.

20. A flat element for floor heating systems according to claim 18, wherein the distance between two adjacent straight lines is less than about 1.5 times the transverse dimension of said spacing elements.

21. A flat element for floor heating systems according to claim 18, wherein the distance separating adjacent spacing elements in a row is constant.

22. A flat element for floor heating systems according to claim 18, wherein the distance between adjacent straight lines determining rows of spacing elements is constant.

23. A flat element for floor heating systems according to claim 18, wherein each said spacing element has a circular cross-section.

24. A flat element for floor heating systems according to claim 18, wherein an outer periphery of the spacing elements arranged along straight lines are coincident with tangents extending parallel to said first straight line.

25. A flat element for floor heating systems according to claim 24, wherein tangents of two adjacent rows of spacing elements are spaced apart a chosen distance in the range of about zero to 50% of the transverse dimension of the spacing elements.

26. The heating element according to claim 18, wherein said adjacent spacing elements on said further straight lines are arranged along additional straight lines which are perpendicular to said first straight line.

27. A flat heating element for floor heating systems, comprising:
first and second plastic plates defining therebetween a cavity,
spacing elements having a diameter, arranged in rows, said spacing elements extending perpendicular to the plane of the plates within said cavity and connecting the plates, and
fluid connections, at diametrically opposing corners of said heating element, communicating with the cavity, the fluid connections oriented such that fluid flow through each connection is substantially parallel to the plane of the plates, one of said connections lying along a first straight line,
a first row of said spacing elements being arranged on said first straight line, further spacing elements being arranged on further straight lines which are parallel with said first straight line and being displaced to each other in the direction of said straight lines, the spacing elements of said further straight lines being arranged to form additional rows of spacing elements which are parallel to said first straight line, said spacing elements being so disposed as to preclude an unimpeded straight line flow path between said fluid connections;
a spacing element closest to said fluid connection being located on the first straight line wherein said fluid connections are located at substantially 45° with respect to respective sides of the plates wherein said plates are rectangular.

28. The heating element according to claim 27, wherein the outer periphery of the spacing elements is arranged to intersect straight lines which are coincident with tangents extending parallel to the first straight line.

29. The heating element according to claim 27, wherein the outer periphery of the spacing elements is arranged to intersect straight lines which are coincident with tangents extending parallel to the first straight line and tangents of two adjacent rows of spacing elements are spaced a chosen distance apart, the distance chosen being in the range 0 to approximately half the diameter of the spacing elements.

30. A flat element for floor heating system, comprising:
first and second plates defining therebetween a cavity;
spacing elements having a transverse dimension parallel to the plane of the plates, arranged in rows, said spacing elements extending perpendicular to the plane of the plates within said cavity and connecting the plates;
a first row of said spacing elements being arranged on a first straight line, further spacing elements being arranged on further straight lines which are parallel with said first straight line;
adjacent spacing elements on the further straight lines parallel to said first straight line being displaced to each other in the direction of said straight lines, the spacing elements of said further straight lines being arranged for form additional rows of spacing elements which are parallel to said first straight line;
first and second fluid connections, at diametrically opposing corners of said heating element, communicating with the cavity, the fluid connections being oriented such that fluid flow through each connection is substantially parallel to the plane of the plates, said first fluid connection lying along said first straight line;
said spacing elements being so disposed as to preclude an unimpeded straight line flow path between said first and second fluid connections;
a spacing element closest to said first fluid connection being located on the first straight line, wherein said fluid connections are located at substantially 45° with respect to respective sides of the plates wherein said plates are rectangular.

31. A flat element for floor heating system, comprising:
first and second plates defining therebetween a cavity;
first and second fluid connections, each having an axis, at diametrically opposing corners of said heating element, communicating with the cavity the fluid connections oriented such that fluid flow through each connection is substantially parallel to the plane of the plates; and
spacing elements having a transverse dimension parallel to the plane of the plates, arranged in rows, said spacing elements extending perpendicular to the plane of the plates within said cavity and connecting the plates;

a first row of said spacing elements being arranged on a first straight line corresponding to a projection of the axis of the first fluid connection, further spacing elements being arranged on further straight lines which are parallel with said first straight line;

adjacent spacing elements on the further straight lines parallel to said first straight line being displaced to each other in the direction of said straight lines, the spacing elements of said further straight lines being arranged to form additional rows of spacing elements which are parallel to said first straight line;

said spacing elements being so disposed as to preclude an unimpeded straight line flow path between said first and second fluid connections;

a spacing element closest to said first fluid connection being located along the first straight line wherein said fluid connections are located at substantially 45° with respect to respective sides of the plates wherein said plates are rectangular.

* * * * *